April 14, 1959  L. M. MINSK  2,882,156
BASIC MORDANTS DERIVED FROM THE REACTION OF CARBONYL CONTAINING
POLYMERS AND AMINOGUANIDINE AND THEIR USE
Filed Dec. 19, 1955

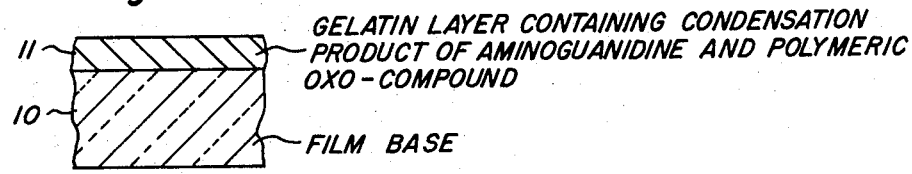

Fig. 1
11 — GELATIN LAYER CONTAINING CONDENSATION PRODUCT OF AMINOGUANIDINE AND POLYMERIC OXO-COMPOUND
10 — FILM BASE

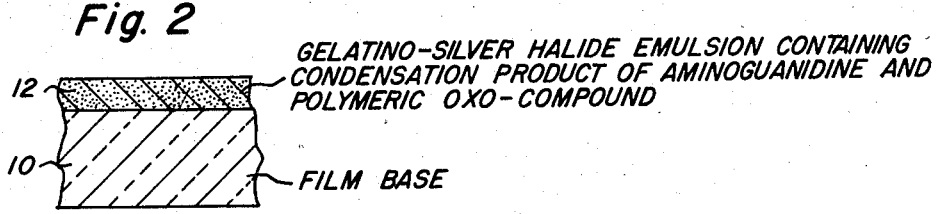

Fig. 2
12 — GELATINO-SILVER HALIDE EMULSION CONTAINING CONDENSATION PRODUCT OF AMINOGUANIDINE AND POLYMERIC OXO-COMPOUND
10 — FILM BASE

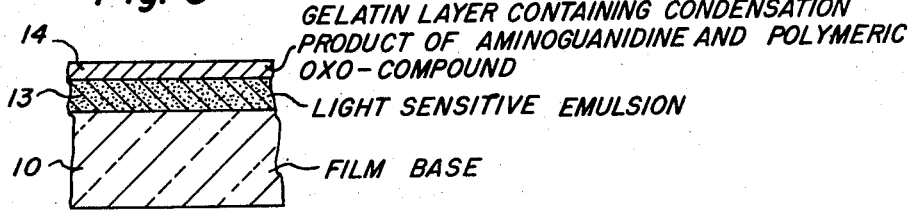

Fig. 3
14 — GELATIN LAYER CONTAINING CONDENSATION PRODUCT OF AMINOGUANIDINE AND POLYMERIC OXO-COMPOUND
13 — LIGHT SENSITIVE EMULSION
10 — FILM BASE

LOUIS M. MINSK
INVENTOR.

BY *Daniel I. Mayne*

*Leonard E. Branshen*

ATTORNEY & AGENT

United States Patent Office 2,882,156
Patented Apr. 14, 1959

2,882,156

BASIC MORDANTS DERIVED FROM THE REACTION OF CARBONYL CONTAINING POLYMERS AND AMINOGUANIDINE AND THEIR USE

Louis M. Minsk, Rochester, N.Y., assignor to Eastman Kodak Company, Rochester, N.Y., a corporation of New Jersey Application December 19, 1955, Serial No. 554,111

7 Claims. (Cl. 96—84)

This invention relates to derived resinous materials obtained by condensing aminoguanidine or salts thereof with polyvinyl resins containing a carbonyl group in a sidechain, and more particularly to those derived from polyvinyl alkyl ketones which latter are especially suitable as mordants in certain photographic materials.

It is known that polymeric oxo-compounds such as polyacroleins, polyvinyl alkyl ketones, polyvinyl aryl ketones and numerous interpolymerization products thereof will react with nitrogen bases such as ammonia and primary alkylamines and arylamines to give polymeric materials having basic properties which are useful in the textile industry for combining with fibers and fabrics to increase the dyeability of these materials with, for example, acid type of dyes. However, the usefulness of such amino derivatives is quite limited. For example, attempts to use them as mordants in photograhpic layers have not proven successful for the reason that many of these have poor compatibility with colloidal materials such as gelatin or its equivalents, but primarily for the reason that they are not strong enough mordants to completely fix the acid dyes used in photographic elements and, therefore, the dye colors tend to diffuse somewhat from the desired fixed positions thereby resulting in poor definition in the photographic image.

I have now found that superior mordants for acid dyes employed in photographic layers may be obtained by condensing a polyvinyl-oxo-compound such as a polyacrolein or a polyvinyl alkyl ketone, or certain copolymers thereof, with aminoguanidine or salts thereof. The resulting polymeric products are very strongly basic and are soluble in dilute acids such as acetic acid. They are compatible in varying amounts with hydrophilic colloidal materials such as gelatin and readily form substantially water-insoluble salts with water-soluble acid dyes. These properties, together with their relatively large molecular dimensions, make the new derived polymers excellent mordants in preventing the diffusion of the dyes when incorporated in light filter layers, in backing layers designed to prevent back reflection from the film support, in compositions for overcoating light-sensitive emulsion layers in interlayers to prevent diffusion of dyes to neighboring layers and in imbibition printing blanks, where the process involves dye transfer from a tanned gelatin relief to the gelatin-dye-mordant composition coated on sheets of cellulose ester, synthetic resin, paper or similar flexible sheet support. Matrix poisoning, i.e. the transfer of some undesirable agent from the blank to the matrix, is avoided by the new derived polymers. Other hydrophilic colloids such as polyvinyl alcohol, alkyl esters of carboxylated cellulose, etc. can be employed in place of gelatin. Also, other materials can be added to the compositions of gelatin and mordant such as silver halide dispersed therein so that there are obtained improved materials which function both as light-sensitive photographic elements and as simple imbibition blanks. The condensation products from polyvinyl methyl ketone and aminoguanidine or salts thereof are outstanding for the photographic applications mentioned above and are preferred.

It is, accordingly, an object of the invention to provide a new class of derived polymeric mordants. Another object is to provide a photographic element having one or more layers containing the derived resins of the invention. Another object is to provide a backing layer containing a resin of the invention. Another object is to provide a light filter layer containing a resin of the invention. Another object is to provide an imbibition type printing blank containing a resin of the invention. Another object is to provide a light-sensitive gelatino-silver halide layer containing a resin of the invention. Another object is to provide overcoating layers containing a resin of the invention. Other objects will become apparent hereinafter.

In accordance with the invention, I prepare my new resinous mordants by condensing aminoguanidine or its salts such as aminoguanidine bicarbonate, aminoguanidine acetate, aminoguanidine butyrate, etc. with polyvinyl oxo-compounds such as polyacrolein, poly γ-methylacrolein, polyvinyl alkyl ketones wherein the alkyl group contains from 1 to 4 carbon atoms such as polyvinyl methyl ketone, polyvinyl ethyl ketone, polyvinyl propyl ketone, polyvinyl butyl ketone, etc. or certain copolymers containing acrolein, methacrolein or said vinyl alkyl ketone components, for example, 1:1 molar ratio copolymers of these components with styrene or alkyl methacrylates wherein the alkyl group contains from 1 to 4 carbon atoms such as methyl, ethyl, propyl or butyl methacrylates, in the proportions of from about 0.25 to 5 parts by weight of the said polymeric oxo-compound to each part by weight of the aminoguanidine compound, followed by decolorizing the reaction mixture with, for example, an alkali metal bisulfite or metabisulfite such as sodium or potassium bisulfite or metabisulfite, sulfur dioxide, sodium or potassium dithionite, metallic zinc and acetic acid, etc., and isolation and purification of the condensation product by precipitation and washing. The temperature of the reaction can vary widely, but preferably the reaction mixture is heated from 50° to 100° C. Although atmospheric pressures are preferred, the reaction may also be carried out above or below normal atmospheric pressures. Advantageously, the reaction is carried out in an inert organic solvent medium in which the polymeric oxo-compound is soluble, for example, in 1,4-dioxane, glacial acetic acid, mixtures of 1,4-dioxane and glacial acetic acid, isopropyl alcohol, isopropyl alcohol-water mixtures, etc.

In the accompanying drawing:

Figure 1 is a sectional view of a transfer blank according to my invention,

Figure 2 is a sectional view of a sensitive film containing a mordant according to my invention, Figure 3 is a sectional view of a film overcoated with a layer containing a mordant according to my invention.

The exact constitution of the derived resinous mordants of the invention, prepared as above described, is not definitely known, but it is believed to be a guanylhydrazone derivative, i.e. a derived polymer containing from about 30–90% by weight of the recurring unit having the structure:

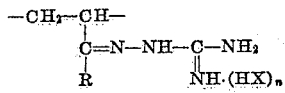

wherein $n$ represents 0 or 1, R represents a hydrogen atom or an alkyl group of from 1 to 4 carbon atoms and X represents the acid radical of an inorganic acid such as hydrochloric acid or an organic acid such as lactic acid, glycolic acid, alkanesulfonic acids containing from 1 to 4 carbon atoms such as methanesulfonic acid, n-butanesulfonic acid, etc. or of a monobasic saturated aliphatic carboxylic acid containing from 2 to 4 carbon atoms such as acetic, propionic or butyric acids, the remaining 70 to 10% of the resin molecule being unreacted vinyl oxo-compound, for example, acrolein, γ-methyl acrolein or vinyl alkyl ketone or combinations of these with styrene or an alkyl methacrylate in the proportions of from about 10–15% by weight of the unreacted vinyl oxo-compound to from about 90–85% by weight of the styrene or alkyl methacrylate, where the starting copolymer contains these components in about a 1:1 molar ratio. The derived resins of the invention are ordinarily employed in the form of their soluble acid salts, preferably as the acetate salts, in which case the derived polymers preferably contain from about 50–85% by weight of the salt unit represented by the above general structural formula, the remainder of the resin molecule being composed of the said unreacted vinyl oxo-compound units.

The following examples will serve further to illustrate the preparation of the derived resinous mordants of my invention and the manner of their use in photographic elements.

EXAMPLE 1

Methyl vinyl ketone was polymerized in 1,4-dioxane on a steam bath for several hours with 1% of benzoyl peroxide, based on the monomer, as the catalyst. The ratio of dioxane to monomer was 1:1 by volume. After dilution of the dope with dioxane the resulting polyvinyl methyl ketone was purified by precipitation in ether and extraction with ether, to remove monomer, etc., followed by drying.

In an all-glass reflux outfit, equipped with a mechanical stirrer, 120 grams of polymethyl vinyl ketone prepared as above were dissolved by stirring on a steam bath with a mixture of 840 cc. of 1,4-dioxane and 360 cc. of glacial acetic acid. With continued heating and stirring, 240 grams of aminoguanidine bicarbonate was added portionwise as fast as gas evolution permitted. After all of the aminoguanidine had been added, heating and stirring was continued for 15 minutes during which time phase separation occurred and the reaction mixture turned dark colored. Then 400 cc. of distilled water were poured into the heated and stirred reaction and, after resolution to a single phase had occurred, 140 grams of zinc dust followed by 160 cc. of glacial acetic acid were added. Stirring and heating were continued until the dark brown color of the dope had changed to a light amber. This required about 30 minutes. The dope was filtered to remove the excess zinc dust and then poured into 10 liters of distilled water containing sufficient sodium hydroxide to cause complete precipitation of the polymer (640 grams of 50% aqueous solution was used in this experiment). The liquid phase was poured away and the soft taffy-like precipitate was kneaded with four 3-liter portions of distilled water containing 10 cc. of 50% aqueous sodium hydroxide pouring away the liquid after each extraction. The product was then dissolved by the addition of 400 cc. of distilled water and 150 cc. of glacial acetic acid. The yield was 1390 grams of solution with a solids content of 12.86%. A portion of this solution or dope (390 g.) was poured in a fine stream into 12-liters of stirred acetone. The precipitated polymer was extracted with acetone and dried in a vacuum desiccator under a constantly applied water pump vacuum. The yield was 38 g. Analysis showed that the polymer obtained contained by weight 48.0% of carbon, 7.7% of hydrogen and 20.8% of nitrogen. Since the calculated value of nitrogen for the guanylhydrazone acetate derivative of polyvinyl methyl ketone is approximately 30% by weight, the analysis indicates that the product consisted of approximately 31% by weight of unreacted vinyl methyl ketone units and 69% by weight of units of the guanylhydrazone acetate of vinyl methyl ketone having the structure:

$$\begin{array}{c}-CH_2-CH-\\ \mid \\ C=N-NH-C-NH_2\\ \mid \quad\quad\quad \parallel \\ CH_3 \quad\quad NH\cdot CH_3COOH\end{array}$$

The above product was an excellent mordant in photographic layers containing acid dyes.

EXAMPLE 2

Into an all glass reflux outfit protected from moisture by a calcium chloride tube was placed a mixture of 1100 g. of methyl vinyl ketone (dry, distilled B.P. 79–81° C.), 1100 cc. of dry 1,4-dioxane, and 11 g. of benzoyl peroxide. The reaction mixture was heated on a steam bath for 16 hours to effect polymerization. To the dope obtained, there were added 6600 cc. of 1,4-dioxane and the residual monomer, along with dioxane, was distilled out under reduced pressure until approximately 3300 cc. of distillate, boiling at 45°–50° C. was obtained. A solution, made by dissolving 2200 g. of aminoguanidine bicarbonate in a mixture of 3300 cc. of glacial acetic acid and 3300 cc. of 1,4-dioxane on a steam bath, was then added to this dope at 50° C. Heating was continued on a steam bath, with good agitation, for 45 minutes, during which time this reaction mixture turned dark and a second phase separated.

Then 3685 cc. of water, 1276 g. of zinc dust and 1466 cc. of glacial acetic acid were added in order, and heating was continued on a steam bath for 70 minutes. The dope was then filtered by pressure through felt, paper, and a layer of filter aid, and poured into 22 gal. of distilled water containing 11 kgs. of 50% sodium hydroxide. The cake obtained was kneaded for 30 minutes with each of four changes of dilute caustic soda, each made by adding 330 cc. of 50% sodium hydroxide to eleven gals. of distilled water. After the last extraction, the cake was drained and redissolved by the addition of 1200 cc. of glacial acetic acid and water to make 8000 g. of dope. The solids content, measured by drying a portion to constant weight at 110° C., was 25.6%. Analysis of the product isolated as in Example 1 gave weight 47.4% of carbon, 7.7% of hydrogen and 24.9% of nitrogen. Since the calculated value of nitrogen for the guanylhydrazone acetate derivative of polyvinyl methyl ketone is approximately 30% by weight, the analysis indicates that the product consisted of approximately 17% by weight of unreacted vinyl methyl ketone units and 83% by weight of units of the guanylhydrazone acetate of vinyl methyl ketone, the structure of which is shown in Example 1. It was an excellent mordant in photographic layers containing acid dyes.

EXAMPLE 3

100 g. of vinyl methyl ketone were polymerized at 90° C. for 16 hours in 100 cc. of 1,4-dioxane containing 1.0 g. of benzoyl peroxide. The reaction of the polyvinyl methyl ketone with aminoguanidine was carried out as in Example 2, except that (a) a 70–30 parts by weight isopropyl alcohol-distilled water solution was substituted in the same amount for the 1,4-dioxane, (b) the reaction time was 60 mins., (c) it was not necessary to add water before reduction since the solution was not turbid, (d) the reduction time to remove color was 2 hours, and (e) the dilute alkaline wash waters were maintained at 10° C. The same product as that of Example 2 was obtained in a yield of 678 g. of 28.9% solution (196 g. dry weight).

EXAMPLE 4

50 g. of vinyl methyl ketone, 50 cc. of isopropyl alcohol and 0.5 g. of benzoyl peroxide were heated for 20 hours in an all glass reflux outfit, protected from moisture by a calcium chloride tube. The clear amber dope obtained was diluted with 250 cc. of isopropyl alcohol, warmed to reflux and chilled. The polymer separated from solution as a soft cake. The supernatant liquid was poured away, thus removing the major portion of any unreacted monomer. The cake was redissolved by the addition of 250 cc. of isopropyl alcohol and 150 cc. of glacial acetic acid, and the dope was heated to gentle boiling with stirring under reflux on a steam bath.

100 g. of aminoguanidine were then added portionwise to the above prepared dope as rapidly as the evolution of gas permitted. The mixture was heated for a total of 30 mins. from the time that aminoguanidine addition was begun. Then 167 cc. of distilled water, 68 cc. of glacial acetic acid and 60 g. of zinc dust were added, and heating and stirring were continued for 2 more hours. The resulting dope was almost colorless. It was filtered by pressure through a layer of filter aid on paper, and poured into 3 liters of distilled water containing 500 g. of 50% aqueous sodium hydroxide. The taffy material obtained was kneaded three times with 2 liter portions of distilled water containing 12.5 cc. of 50% sodium hydroxide per liter, pouring off the supernatant liquid after each, after which it was put in solution by adding to it 65 cc. of glacial acetic acid and stirring. There was thus obtained 367 g. of dope with a solids content of 16.7%. Analysis of this polymeric product, after isolation by precipitation in acetone and drying, showed that it contained a nitrogen content of 24.3%, indicating thereby that the product consisted of approximately 19% by weight of unreacted vinyl methyl ketone units and the remainder of about 81% by weight of units of the guanylhydrazone acetate of vinyl methyl ketone having the structure shown in Example 1.

EXAMPLES 5–10

The procedure of Example 2 was followed employing various ratios of polyvinyl methyl ketone to aminoguanidine bicarbonate. The results obtained are as follows:

Table I

| Example No. | Aminoguanidine Bicarbonate per 100 g. of Polyvinyl Methyl Ketone, g. | Analysis, percent | | | Calculated Amount, Percent by wgt. | |
|---|---|---|---|---|---|---|
| | | C | H | N | Unreacted Vinyl Methyl Ketone Units | Guanylhydrazone Acetate Derivative Units |
| 5 | 100 | 57.3 | 7.6 | 16.9 | 43.9 | 56.1 |
| 6 | 125 | 55.3 | 8.3 | 18.6 | 38.2 | 61.8 |
| 7 | 150 | 51.3 | 7.9 | 21.2 | 29.6 | 70.4 |
| 8 | 175 | 49.4 | 7.1 | 22.1 | 26.6 | 73.4 |
| 9 | 200 | 49.1 | 7.6 | 24.0 | 20.3 | 79.7 |
| 10 | 400 | 46.2 | 8.0 | 25.2 | 16.3 | 83.7 |

The values for percentage content of vinyl methyl ketone units and units of guanylhydrazone acetate derivatives of vinyl methyl ketone were calculated from the nitrogen analyses. It will be noted that further increase in the amount of aminoguanidine bicarbonate employed above 200 g. per 100 g. of polyvinyl methyl ketone did not produce a corresponding conversion the reaction appearing to approach a limiting value of about 85% by weight of the guanylhydrazone acetate derivative. All of the products of these examples showed excellent mordanting power for acid dyes in the various mentioned photographic layers, for example, in imbibition blanks.

EXAMPLE 11

500 g. (0.543 mole) of propionyl chloride were added dropwise to a stirred cooled suspension of 655 g. (4.85 moles) of aluminum chloride in 1.5 liters of methylene chloride over a period of 15 mins. The aluminum chloride dissolved completely giving an orange solution. Gaseous ethylene was passed through the cooled, stirred mixture for three hours keeping the temperature at about 8° C. As the temperature began to drop, addition was stopped. The mixture was stirred for an additional hour. The reaction mixture was then poured into 4 kg. of ice containing 400 cc. concentrated hydrochloric acid. After separating the two phases, the aqueous phase was extracted with 500 cc. of methylene chloride. The combined methylene chloride extracts were washed successively with 10% hydrochloric acid, salt solution, sodium bicarbonate solution, and salt solution again. After drying overnight over anhydrous sodium sulfate, the solvent was removed under vacuum. The residue was distilled; collecting the fraction between 52–55°, at 15 mm., giving 303 g. of the product, 1-chloropentanone-3.

A mixture of 100 g. (0.83 mole) of 1-chloropentanone-3 prepared as above and 300 g. (2.0 moles) of N,N-diethylaniline in a 2 liter 2-necked flask containing a thermometer and still head was heated rapidly over a free flame. When the temperature reached 165° C., a vigorous reaction took place and product distilled. When the exothermic reaction had stopped, the reaction mixture was heated to an internal temperature of 210° C. giving a total of 80 g. of distillate. This was fractionated twice through a 3-foot, helix-packed, vacuum jacked, column giving 35 g. of product, boiling at 37.2–37.4°C. at 68 mm. pressure, and identified as vinyl ethyl ketone.

A mixture of 75 g. of vinyl ethyl ketone (prepared as above), 75 cc. of dioxane, and 0.75 g. of benzoyl peroxide was heated under reflux on a steam bath for three days giving a light yellow, viscous dope which was completely soluble in ether. The solution was poured into 1.5 liters of hexane giving a tacky mass which was purified by kneading several times with hexane, then dried under vacuum. The yield was 50 g. of polyvinyl ethyl ketone.

To a hot solution of 50 g. of polyvinyl ethyl ketone (prepared as above) in 150 cc. of glacial acetic acid and 350 cc. of dioxane, there were added in small portions, with stirring, 100 g. of aminoguanidine bicarbonate. After the addition, the mixture was kept on the steam bath for 18 hours by which time a sample was soluble in dilute acetic acid. To the yellow solution were added with stirring and heating, 58 g. of zinc dust, 67 cc. of glacial acetic acid, and 170 cc. of water. After stirring for one and one-half hours, the hot mixture was filtered. The filtrate was then poured into 4 liters of water, containing 200 g. of sodium hydroxide, giving a pink solid. This was filtered on glass wool, washed with 1.6 liters of 2% sodium hydroxide and pressed dry. The gummy solid was dissolved in a mixture of 150 cc. of water and 150 cc. of glacial acetic acid. The solution had a solids content of 12.3% indicating a yield of 38 g. of polymeric product. A portion of the above dope was poured into an excess of 2 normal sodium hydroxide solution. The friable precipitate obtained was washed with water to remove excess sodium hydroxide and dried in a vacuum desiccator over calcium chloride under a constantly applied water pump vacuum. Analysis of this product showed that it contained by weight 76.2% of carbon, 8.8% of hydrogen and 6.9% of nitrogen.

EXAMPLE 12

To a cooled suspension of 453 g. (3.4 moles) of anhydrous aluminum chloride in 1.8 liters of chloroform there were added over a period of 15 minutes, with vigorous stirring, 343 g. (3.24 moles) of butyryl chloride keeping the temperature below 10° C. After the addition, stirring and cooling were continued until the temperature dropped to 4° C. The aluminum chloride dissolved completely giving an amber solution. With continued stirring and cooling, gaseous ethylene was passed through the solution at a rate to keep the temperature at 8° C. After two hours, the temperature dropped, indicating completion of the reaction. Stirring was continued for an additional hour. After pouring the mixture onto 3 kg. of ice containing 750 cc. of concentrated hydrochloric acid, the two phases were separated. The aqueous phase was extracted with 500 cc. of chloroform and discarded. The combined chloroform extracts were washed successively with 10% hydrochloric acid (twice) and saturated salt solution and then dried over anhydrous sodium sulfate. To the filtered solution there were added 50 cc. of dimethylaniline. After the chloroform had been removed under vacuum, the residue was distilled, collecting the fraction boiling between 60 and 68° at 10 mm. The yield was 406 g. equivalent to about 75% of theory of chlorohexanone-3.

A mixture of 100 g. (0.75 mole) of 1-chlorohexanone-3 prepared as above and 300 g. (2.0 moles) of N,N-diethylaniline, in a 1-liter 2-necked flask containing a still head and thermometer, was heated rapidly over a free flame. When the internal temperature reached 175° C. a vigorous reaction took place, and material began to distill. When the exothermic reaction had subsided, heating was continued until the internal temperature reached 210° C. At this point, the temperature of the distillate which had been between 125–140° dropped markedly, so the reaction was stopped. The distillate (61 g.) was fractionated under a vacuum of 57 mm. giving 31.4 g. (42%) of the product boiling between 50 and 55° C. This was redistilled through a 3-foot, helix-packed, vacuum jacketed, column collecting the fraction boiling between 54.8 and 55.2 at 65 mm. The yield was 25 g. (35%) of vinyl propyl ketone.

A mixture of 80 g. (0.8 mole) of propyl vinyl ketone prepared as above, 75 cc. dioxane, and 0.80 g. of benzoyl peroxide was kept under reflux in a constant temperature bath at 90° C. for three days giving a moderately viscous dope. To this dope, cooled to room temperature, there were added 1.5 liters of hexane causing a heavy oil to separate. This was washed by decantation with four fresh portions of hexane and dried under vacuum leaving polyvinyl propyl ketone in the form of a viscous oil as the residue.

A mixture of 105 cc. of dioxane, 105 cc. of glacial acetic acid, and 50 g. of aminoguanidine bicarbonate was heated to 90° C. on a steam bath and stirred until evolution of carbon dioxide had stopped. This hot solution was then added to a solution of 35 g. of polyvinyl propyl ketone in 210 cc. of dioxane. The stirred mixture was heated on a steam bath for three days. Samples removed at periodic intervals were insoluble in water, but soluble in 60% aqueous acetic acid to give a light orange colored solution. To the hot solution were added 58 g. of zinc dust, 67 cc. of glacial acetic acid and 65 cc. of water. The mixture was stirred for one and one-half hours, then filtered while still hot. The filtrate was poured into 3 liters of water containing 250 g. of sodium hydroxide. A brown gummy precipitate separated which solidified within an hour. It was filtered, washed with water and air dried. A yield of 10 g. of product was obtained. Analysis of the acetate salt showed that it contained by weight about 57.8% of carbon, 8.0% of hydrogen and 3.1% of nitrogen. Since the calculated value of nitrogen for the guanylhydrazone acetate derivative of polyvinyl propyl ketone is approximately 26.1%, the analysis indicates that the product consisted of aproximately 12% by weight of units of the guanylhydrazone acetate of vinyl propyl ketone, the remaining 88% being unreacted vinyl propyl ketone units. This product mordanted acid dyes.

EXAMPLE 13

Aminoguanidine bicarbonate (5 g.) was dissolved in a mixture of 15 cc. of glacial acetic acid and 15 cc. of dioxane by heating on a steam bath. The solution was added to a hot solution of 5 g. of polymethyl isopropenyl ketone in 30 cc. of dioxane. The mixture was heated one and one-quarter hours on a steam bath with stirring. A dark brown color resulted. A sample removed at this point was soluble in 40% aqueous acetic acid. To the solution were added 11.7 cc. of water, 4 g. of zinc dust and 5 cc. of glacial acetic acid. The mixture was heated for one hour with stirring giving an olive color. After dilution with 50 cc. of dioxane, the mixture was filtered hot. The filtrate was poured into a solution of 25 g. sodium hydroxide in 500 cc. of water giving a yellow gum which slowly hardened. It was filtered on glass wool, washed several times with water and air dried. The product was ground in a mortar several times with distilled water and again air dried. Analysis of the acetate salt showed that it contained by weight about 70.7% of carbon, 9.3% of hydrogen and 3.3% of nitrogen. Since the calculated value of nitrogen for the guanylhydrazone acetate derivative of polyvinyl propyl ketone is approximately 28%, the analysis indicates that the product consisted of approximately 12% by weight of units of the guanylhydrazone acetate of isopropenyl methyl ketone, the remaining 88% being unreacted isopropenyl methyl ketone units. This product mordanted acid dyes.

EXAMPLE 14

Copolymers of methyl methacrylate and vinyl methyl ketone in the molar ratio of 1:1 and 1:3 were prepared by heating the two components in the proper molar ratios at 90° C. for 16 hours with 1% benzoyl peroxide (based on the total weight of the monomer) and 1 cc. of 1,4-dioxane per gram of the combined weight of the monomers. The copolymerizates were isolated by precipitating in water, washing with water, and drying at 50° C.

A. 17 g. of the 1:1 copolymer prepared as above were dispersed in 70 cc. of 1,4-dioxane. To this, at 90° C., was added a solution of 20 g. of aminoguanidine bicarbonate in 52 cc. of 1,4-dioxane and 52 cc. of glacial acetic acid, also at 90° C. The reaction mixture was stirred at 90° C. for 4 hours and then poured into a solution, at 15° C., of 170 g. of 50% aqueous sodium hydroxide in 850 cc. of distilled water. The brown fibrous precipitate was extracted with distilled water until free from sodium hydroxide and dried in a vacuum desiccator at room temperature under a constantly applied water pump vacuum. This product analyzed 9.8% nitrogen which value is equivalent to approximately 22% by weight of units of the guanylhydrazone derivative of methyl ketone, the remaining 78% being unreacted vinyl methyl ketone units and methyl methacrylate units. This product was soluble in dilute aqueous acetic acid and showed excellent mordanting properties.

B. 15.5 g. of the 1:3 copolymer prepared as above were dispersed in 62 cc. of 1,4-dioxane. To this was added, at 90° C., a solution of 23 g. of aminoguanidine bicarbonate in 47 cc. of 1,4-dioxane and 47 cc. of glacial acetic acid, also at 90° C., and the reaction mixture was stirred at 90° C., for 45 min. Some turbidity developed during this time. A clear solution was obtained by the addition of 25 cc. of distilled water. The product was isolated by precipitation in alkali, followed by acetone extraction until the precipitate became friable. It was dried in a vacuum desiccator under a constantly applied water pump vacuum at room temperature. The nitrogen content was 18.1%, which value is equivalent to approximately 41% by weight of units of the guanylhydrazone derivative of vinyl methyl ketone, the remaining 60% being unreacted vinyl methyl ketone units and methyl methacrylate units. This product was soluble in dilute aqueous acetic acid and showed excellent mordanting properties.

EXAMPLE 15

A mixture of 300 g. (4.3 mole) of freshly distilled α-methyl acrolein and 430 g. (4.3 moles) of freshly distilled methyl methacrylate was heated under reflux in a 92° C. bath for 96 hours. The mixture solidified almost completely. It was dissolved in a mixture of 1020 cc. of ethylene dichloride and 90 cc. of absolute alcohol.

The solution was poured portion-wise into 7 liters of absolute alcohol causing precipitation of a fibrous solid. Washing with another 3.5 liters of alcohol caused the precipitate to break down into a white friable powder. It was filtered and air dried. A yield of 350 g. of an approximately 1:1 copolymer of α-methyl acrolein and methyl methacrylate was obtained.

A mixture of 150 cc. of acetic acid, 150 cc. of dioxane, and 100 g. of aminoguanidine bicarbonate was heated on a steam bath. When the evolution of gas had ceased, the hot solution was added to a solution of 50 g. of methyl methacrylate-methacrolein copolymer prepared as above in 200 cc. of dioxane, which was being heated on a steam bath. After 3 hours of heating, a sample was completely soluble in water. The solution was colored light yellow. With continued heating and stirring, 167 cc. of water, 60 g. of zinc dust, and 67 cc. of glacial acetic acid were added. After stirring on a steam bath for one and one-half hours, the hot mixture was filtered. The cooled solution was poured into a solution of 250 g. of sodium hydroxide in 4 liters of water. A white flocculent solid formed which slowly coagulated to a dough. This was washed with 500 cc. of 2% sodium hydroxide solution. After air drying, the dough was dissolved in a mixture of 100 cc. of acetic acid and 50 cc. of water, and reprecipitated by pouring into 1 liter of acetone. A white solid formed which was filtered and air dried. A yield of 12 g. was obtained. The nitrogen content was 13.2%, which value is equivalent to approximately 44% by weight of units of the guanylhydrazone derivative of α-methyl acrolein, the remaining 56% being unreacted α-methyl acrolein units and methyl methacrylate units. This product mordanted acid dyes.

EXAMPLE 16

A mixture of 357 g. (5.0 moles) of freshly distilled methacrolein and 520 g. (5.0 moles) of freshly distilled styrene was heated under reflux in a 92° C. bath for 96 hours, giving a very viscous dope. This was dissolved in a mixture of 1 liter of ethylene dichloride and 90 cc. of alcohol. Pouring into 7 liters of absolute alcohol caused precipitation of a tacky solid which hardened on washing in another 3.5 liters of alcohol into a friable powder. This was filtered and air dried. A yield of 454 g. of an approximately 1:1 copolymer of methacrolein and styrene was obtained.

To a solution of 25 g. of the coplymer prepared as above in 175 cc. of dioxane and 75 cc. of glacial acetic acid, warmed on a steam bath were added porion-wise 50 g. of aminoguanidine bicarbonate. After heating for 4 hours, a sample of the light yellow solution was soluble in dilute aqueous acetic acid. While heating and stirring was continued, 75 cc. of water, 30 g. of zinc dust, and 33 cc. of glacial acetic acid were added. After heating for an additional hour, the hot mixture was filtered. The filtrate was poured into a solution of 125 g. of sodium hydroxide in 2 liters of water. A flocculent white solid separated. This was filtered and washed with 1 liter of 2% aqueous sodium hydroxide. The resulting solid was dissolved in 100 cc. of acetic acid and filtered giving a clear amber colored solution. On pouring this solution into one liter of acetone, a tan solid precipitated. This was dried under vacuum leaving 17 g. of polymeric product. The nitrogen content was 14.5%, which value is equivalent to approximately 48.5% by weight of units of the guanylhydrazone acetate derivative of α-methyl acrolein, the remaining 51.5% being unreacted α-methyl acrolein units and styrene units. This product mordanted acid dyes.

EXAMPLE 17

This example shows the use of the derived polymers of the invention in imbibition or dye transfer blanks.

454 g. of gelatin were soaked in 5360 cc. of distilled water until well swollen, and the mixture then heated to 40° C. to dissolve the gelatin. There were then added some saponin solution as a coating aid, 65 cc. of 50% aqueous glycerine and 100 g. of a 10% solution of the resinous mordant produced according to Example 1 in dilute acetic acid. The pH of the mixture was adjusted to approximately 4.2 and 27 cc. of 10% formaldehyde solution was added. The resulting solution was coated onto a cellulose acetate film support at the rate of approximately 1.25 g. of gelatin (dry weight) per square foot.

EXAMPLE 18

This example shows the use of the derived polymers of the invention in gelatino-silver halide emulsion layers.

To 3900 g. of a positive type bromoiodide emulsion, containing 1 mol of silver and 295 g. gelatin, were added some saponin solution, 42 cc. 50% glycerin, an antifoggant agent such as 6-nitrobenzimidazole nitrate and 290 g. of a 22.8% solution of the resinous mordant, described in Example 1. The pH was adjusted to approximately 4.2 and 17.4 cc. of 10% formaldehyde were added. This was coated onto a cellulose acetate support at the rate of 1 mol of silver per 280 sq. ft. Antifoggants of the type described in L. G. S. Brooker et al. U.S. Patent 2,131,038, dated September 27, 1938, have also been found suitable for use in products of this type.

Strips of the coatings of above Examples 17 and 18, together with a check fine grain silver bromoiodide emulsion containing no mordant were processed for 95 seconds, at 70° F., in a developer comprising a mixture of hydroquinone and monomethyl-p-aminophenol sulfate as the developing agents, followed by fixing in a hypo fixing solution, washing and drying. A strip of Eastman Matrix Film (an unhardened wash-off relief type of emulsion), which had been exposed to a resolving power chart and processed to give a relief image, was dyed in a 0.5% solution of Erio Fast Cyanine Dye (Colour Index No. 1053) in 1% aqueous acetic acid; washed, air-squeeged and the dye transferred to the mordanted blank coating described in above Example 17, which had been pre-soaked in distilled water. A second transfer was made to a different area of this mordanted blank from the same matrix, except in this case a 1.0% solution of above mentioned dye in 1% acetic acid was used. Transfers were made in a similar manner to the mordant film described in Example 18, and also to the check fine grain film coating containing no mordant. The coatings described in Examples 17 and 18 were found to give much better definition than the unmordanted check, and also to give higher dye density, especially on the second transfer.

EXAMPLE 19

This example shows the use of the derived polymers of the invention as overcoating layers over light-sensitive gelatino-silver halide emulsion layers.

1 lb. of dry gelatin was soaked in water and dissolved at approximately 40° C. To this was added a solution containing 150 g. of the resinous mordant prepared according to Example 1, 65 cc. of 50% glycerine and some saponin solution. The mixture was diluted with water to a satisfactory concentration for coating, the pH was adjusted to 4.2–4.3, and 27 cc. of 10% formaldehyde solution were added. This solution was then coated over the light-sensitive gelatino-silver halide emulsion layer at the rate of 1 lb. dry gelatin per 1300 sq. ft. The element thus obtained on exposing to an image, developing and fixing functioned as a mordanted dye transfer blank containing the silver image as a density.

The mordanted element of my invention will now be described by reference to the accompanying drawing. As shown therein, Figure 1 is a sectional view of a dye transfer blank having a film base 10 of cellulose acetate or any suitable material having thereon a gelatin layer 11 containing a condensation product of aminoguanidine and a polymeric oxo-compound. Figure 2 is a sectional view of a sensitive film having the film base 10 coated with a layer 12 of gelatino-silver halide emulsion containing the resin mordant. Figure 3 is a sectional view of a film having the film base 10 coated with a light-sensitive layer 13, for example a gelatino-silver halide emulsion layer, the emulsion layer 13 being overcoated with a gelatin layer 14 containing the resin mordant.

Advantageously, there may be also incorporated in the gelatino-silver halide emulsion layers of the above Examples 18 and 19 a mordanting material such as 2-vinylpyridine polymer metho-p-toluene sulfonate and similar compounds described in R. H. Sprague et al., U.S. Patent 2,484,430, dated October 11, 1949. It is often advantageous also to incorporate a plasticizing agent into the above gelatino-silver halide emulsion layers such as a polymeric hydrosol made from esters of acrylic or methacrylic acid, amides such as methacrylamide, and styrene, which are described in W. F. Fowler, Jr., U.S. application Serial No. 272,709, filed February 20, 1952 (now U.S. Patent 2,739,137, dated March 20, 1956), or a polymeric hydrosol made from esters of acrylic or methacrylic acid, and a second component such as styrene, acrylonitrile, or other hydrophobic monomers, polymerized in the presence of a cationic surfactant, or a polymeric hydrosol made from esters of acrylic or methacrylic acid, a protein material such as glue, gelatin, acylated derivatives thereof, etc., and a third component such as acrylonitrile, vinyl acetate, isopropenyl acetate, etc., which are described in J. W. Gates, Jr. et al., U.S. application Serial No. 398,236, filed December 14, 1953.

By proceeding as described in Examples 17, 18 and 19, other of the derived polymers of the invention may be used for preparing improved photographic elements such as imbibition or dye transfer blanks, gelatino-silver halide layers and overcoating layers. For example, the polymers of Examples 2–10, also have similarly excellent mordanting properties and give generally the same kind of elements as described in Examples 17, 18 and 19. Also, all of the products of Examples 1–10, as previously mentioned, may also be used for filter layers, backing layers, and as interlayers separating light-sensitive layers containing acid dyes or components capable of forming such dyes on processing the light-sensitive element as in elements designed for color photography. While the use of the derived polymers of the invention has been illustrated with the condensation products of polyvinyl methyl ketone and aminoguanidine or its salts, it will be understood that all of the derived polymers of the invention have mordanting properties, but to a much lesser degree than those derived from polyvinyl methyl ketone.

What I claim is:

1. A photographic element comprising a flexible sheet support material having thereon at least one layer comprising a hydrophilic colloid selected from the group consisting of a gelatin, polyvinyl alcohol and an alkyl ester of a carboxylated cellulose in admixture with a vinyl polymer consisting of from 50–85% by weight of a recurring structural unit represented by the following general structure:

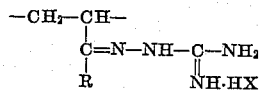

wherein R represents an alkyl group containing from 1–4 carbon atoms and X represents the radical of an acid selected from the group consisting of hydrochloric acid, lactic acid, glycolic acid, and alkanesulfonic acid containing from 1–4 carbon atoms and a monobasic saturated aliphatic carboxylic acid containing from 2–4 carbon atoms, and conversely from 50–15% by weight of a recurring vinyl alkyl ketone unit wherein the alkyl group contains from 1–4 carbon atoms and is the same alkyl radical as the said R radical.

2. A light-sensitive photographic element comprising a flexible sheet support material having thereon at least one gelatin silver halide emulsion layer and having distributed in the said layer a vinyl polymer consisting of from 50—85% by weight of a recurring structural unit represented by the following general structure:

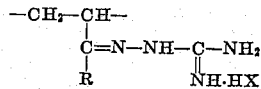

wherein R represents an alkyl group containing from 1–4 carbon atoms and X represents the radical of an acid selected from the group consisting of hydrochloric acid, lactic acid, glycolic acid, an alkanesulfonic acid containing from 1–4 carbon atoms and a monobasic saturated aliphatic carboxylic acid containing from 2–4 carbon atoms, and conversely from 50–15% by weight of a recurring vinyl alkyl ketone unit wherein the alkyl group contains from 1–4 carbon atoms and is the same alkyl radical as the said R radical.

3. A light-sensitive photographic element comprising a flexible cellulose sheet material having thereon at least one gelatin silver halide emulsion layer and having distributed in the said layer a vinyl polymer consisting of from 50–85% by weight of the following recurring structural unit:

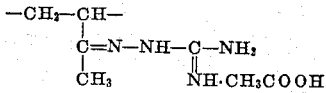

and conversely from 50–15% by weight of recurring vinyl methyl ketone units.

4. A light-sensitive photographic element comprising a flexible cellulose acetate sheet support material having thereon at least one gelatin silver halide emulsion layer and having distributed in the said layer a substantially water-insoluble salt of a water-soluble dye with a vinyl polymer consisting of from 50–85% by weight of the following recurring structural unit:

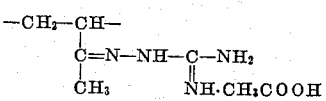

and conversely from 50–15% by weight of recurring vinyl methyl ketone units.

5. A light-sensitive photographic element comprising a flexible cellulose acetate sheet support material having thereon at least two gelatin layers, at least one of said gelatin layers being a silver halide emulsion layer and at least one of said gelatin layers having distributed therein a substantially water-insoluble salt of a water-soluble acid dye with a vinyl polymer consisting of from 50–85% by weight of the following recurring structural unit:

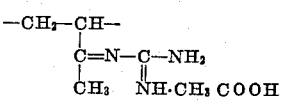

and conversely from 50–15% by weight of recurring vinyl methyl ketone units.

6. A light-sensitive photographic element comprising a flexible cellulose acetate sheet material having thereon at least one gelatin silver halide emulsion layer and having coated thereover a layer of gelatin having distributed therein a vinyl polymer consisting of from 50–85% by weight of the following recurring structural unit:

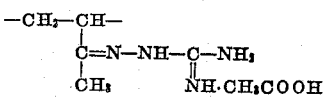

and conversely from 50–15% by weight of recurring vinyl methyl ketone units.

7. A dye transfer blank, not sensitized to light, comprising a flexible sheet support material coated on at least one side with a layer of gelatin having distributed therein a vinyl polymer consisting of from 50–85% by weight of the following recurring unit:
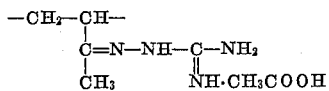
and conversely from 50–15% by weight of recurring vinyl methyl ketone units.
References Cited in the file of this patent
UNITED STATES PATENTS
| | | |
|---|---|---|
| 2,352,387 | Hopff et al. | June 27, 1944 |
| 2,368,647 | Dreyfuss | Feb. 6, 1945 |
| 2,420,611 | Mueller | May 13, 1947 |
| 2,452,705 | Welford | Nov. 2, 1948 |
| 2,563,469 | Jennings | Aug. 7, 1951 |
| 2,659,712 | Thompson et al. | Nov. 17, 1953 |